US008782306B2

(12) United States Patent
Printezis et al.

(10) Patent No.: US 8,782,306 B2
(45) Date of Patent: *Jul. 15, 2014

(54) LOW-CONTENTION UPDATE BUFFER QUEUING FOR LARGE SYSTEMS

(75) Inventors: Antonios Printezis, Burlington, MA (US); Paul H. Hohensee, Nashua, NH (US)

(73) Assignee: Oracle America, Redwood City, CA (US)

( * ) Notice: Subject to any disclaimer, the term of this patent is extended or adjusted under 35 U.S.C. 154(b) by 954 days.

This patent is subject to a terminal disclaimer.

(21) Appl. No.: 12/699,370

(22) Filed: Feb. 3, 2010

(65) Prior Publication Data

US 2011/0191508 A1 Aug. 4, 2011

(51) Int. Cl.
*G06F 13/00* (2006.01)
(52) U.S. Cl.
USPC ............................................ 710/53; 711/165
(58) Field of Classification Search
USPC .......................................................... 710/53
See application file for complete search history.

(56) References Cited

U.S. PATENT DOCUMENTS

| 6,526,422 | B1 * | 2/2003 | Flood et al. ........................... 1/1 |
| 6,826,583 | B1 * | 11/2004 | Flood et al. ........................... 1/1 |
| 7,702,663 | B2 * | 4/2010 | Bacon et al. ................... 707/813 |
| 7,779,054 | B1 * | 8/2010 | Printezis et al. ............... 707/813 |
| 2005/0132374 | A1 * | 6/2005 | Flood et al. .................... 718/100 |

* cited by examiner

*Primary Examiner* — Titus Wong
(74) *Attorney, Agent, or Firm* — Marsh Fischmann & Breyfogle LLP; Kent A. Lembke

(57) ABSTRACT

A method for queuing thread update buffers to enhance garbage collection. The method includes providing a global update buffer queue and a global array with slots for storing pointers to filled update buffers. The method includes with an application thread writing to the update buffer and, when filled, attempting to write the pointer for the update buffer to the global array. The array slot may be selected randomly or by use of a hash function. When the writing fails due to a non-null slot, the method includes operating the application thread to add the filled update buffer to the global update buffer queue. The method includes, with a garbage collector thread, inspecting the global array for non-null entries and, upon locating a pointer, claiming the filled update buffer. The method includes using the garbage collector thread to claim and process buffers added to the global update buffer queue.

11 Claims, 9 Drawing Sheets

LOW-CONTENTION UPDATE BUFFER QUEUING FOR LARGE SYSTEMS

BACKGROUND

1. Field of the Description

The present description relates, in general, to memory management in computer systems and virtual machine environments, including Java® virtual machines (JVMs), and, more particularly, to methods and systems for providing garbage collection suited for large systems (e.g., with relatively large numbers of active application threads such as hundreds up to 1000 to 2000 or more threads) to reduce contention when accessing update buffers provided for or used by application threads (also known as mutator threads). Generally, though, the method applies to communicating any information from application/mutator threads to garbage collector (GC) threads (e.g., GC threads being a proxy for the GC/memory management system and buffers containing object reference update information providing just one example of such information). The method ensures that the application threads get better latencies, possibly at the expense of the GC threads (e.g., all threads are not treated equally with regard to latency in some of the embodiments of the described method).

2. Relevant Background

In a computer system, the effective control of the allocation of memory resources is desirable to the successful operation and scalability of the computer system (e.g., the whole hardware stack, operating system (OS), Java® virtual machines (JVMs), software, and the like). Software applications run more efficiently in environments in which steps are taken to proactively manage available memory resources to ensure that only those data objects that are currently being used are stored in memory, while unused entities or data objects are cleanly removed. In some systems and virtual machines (for example, the NM), the system periodically performs garbage collection using one or more garbage collector (GC) threads. During garbage collection, the virtual machine scans the entire data object memory (or application heap) and finds which objects that have been stored in the heap are currently live and which objects the program can no longer reference. The areas of the heap occupied by unreferenceable objects are then returned to the virtual machine for subsequent use.

Generally, garbage collection (GC) is a form of automatic memory management that frees a programmer from having to worry about releasing no-longer used memory resources. Typically, garbage collector threads are used in the context of, or in computing environments involving, programming languages that allocate memory as objects. For example, each application (or its threads) may have a pool of data objects in its heap and garbage collector threads find out which of these objects are unreachable and reclaim them. A garbage collector thread consumes finite computing resources performing actions that manage the process of deciding what memory is to be freed and when and how such memory should be made available to an application (or application threads). Hence, a penalty for using garbage collectors is GC-created overhead leading to decreased application processing efficiency. More particularly, in garbage collected runtime environments, it is often the case that mutator or application threads must notify the garbage collector of updates they perform on object reference fields. This information can be used by the garbage collector in several ways such as to update remembered sets or for the correct operation of an incremental marking scheme.

There are many ways to implement garbage collection. One technique involves dirtying entries of a card table to notify the garbage collector which areas or "cards" of the heap contain modified objects. In another process, update buffers are generated that contain information about each update a mutator thread has performed, and garbage collector threads periodically read and process these buffers. In this latter garbage collection approach, the update buffers are typically added by the application threads or mutators to a global queue (or global input buffer queue) and removed from the global queue by the garbage collector threads. An atomic operation, such as a lock or compare and swap (CAS) operation, may be used to add and/or remove the update buffer from the queue. A point of contention may arise as buffers are added and removed from the global queue that limits scalability and performance of the computer systems that implement such a garbage collection process.

Hence, there is a need for improved methods of providing garbage collection with less contention to memory and/or other resources of a computing system. Preferably, such garbage collection methods and systems may provide data structures that cause (or allow) applications to do as little work as possible while causing the garbage collector thread(s) to do more work (e.g., create a desired asymmetry in which the garbage collectors may have more latency than the mutator threads).

SUMMARY

Briefly, a technique is provided for providing an effective and efficient garbage-collected runtime environment for large computer systems (e.g., with relatively large numbers of active application threads such as hundreds up to 1000 to 2000 or more threads). Each mutator thread uses a slot in a block of memory to which only it has access (this block of memory is often termed Thread Local Storage or TLS) to provide a current update buffer pointer. Initially, the current update buffer pointer may reference an empty buffer. While the mutator thread is running, it writes update information to the current buffer and when full, it tries to make it available, using an atomic operation such as a lock or CAS, for garbage collection in a global array (e.g., a hash table with a number of slots/data entry points for holding buffer pointers/references) rather than immediately adding it to a global update buffer queue (as occurred in prior systems). There are several ways the mutator thread may decide which entry/slot in this global array to use, e.g., a hash based on thread identification (ID) or even a random number or random selection of the slot.

When the slot of the global array is null (not yet used by a mutator thread to make an update buffer available), the mutator thread attempts to store, using a CAS or the like, its buffer pointer into the slot of the global array. If the mutator thread does not succeed in the attempt, i.e., finds the slot of the global array to be non-null and, therefore unavailable, the mutator thread may act to repeat this process one or more times until successful or until a maximum retry number is exceeded (and, note, each time the mutator thread may try to use a different array slot). At this point, the mutator thread may add the update information to the global update buffer queue using a CAS or the like. Meanwhile/concurrently, each GC thread periodically checks the global array for non-null entries, and, when such pointers/references are found, the GC thread claims the associated update buffer with a CAS or the like and processes it. Each GC thread also typically will check the global queue for any added update buffers, and, when such a buffer is found available, the GC thread will claim (again via a CAS or the like) the buffer and process it. The GC thread may be self-pacing with a throttling mechanism modifying the GC threads pace (e.g., increasing or decreasing a delay period between its processing of the global array) such that the GC thread is less likely to find the global array empty (e.g., processing too fast for the number/activity of the producer threads) or to find the global queue not empty (e.g., processing too slowly which forces threads to add their filled update buffers to the global queue). From the above, it should be clear that when application threads make buffers available on the global array they do it with an atomic operation. If the application threads did not use an atomic operation, then two of them may see the same null entry and try to store a reference into it, and only one would succeed and the buffer of the other would basically be lost.

More particularly, a method is provided for queuing update buffers to enhance garbage collection in a computer system, e.g., by reducing contention problems for the application and GC threads. The method includes, in the memory of the computer system, providing a global update buffer queue and a global array with a plurality of slots for storing pointers to update buffers filled by mutator threads. The method also includes running a mutator thread in the memory of the computer system. Additionally, the method includes providing, for the mutator thread, an update buffer in the memory and a data structure including a current update buffer slot with a pointer to the update buffer. Then, with the mutator thread, the method includes writing to the update buffer and, after the writing fills the update buffer, attempting with the mutator thread to write the pointer for the filled update buffer to one of the pointer slots of the global array. When the attempt fails, the method includes operating the mutator thread to add the filled update buffer to the global update buffer queue. Typically, the method further includes, with a garbage collector thread running in the virtual machine of the computer system, inspecting the global array for non-null entries in the plurality of slots and, upon locating the pointer, claiming the filled update buffer for processing.

In some cases, the claiming by the GC thread is performed with an atomic operation and the claiming further comprises changing the one of the pointer slots to null. The method may further include, with the garbage collector thread when the plurality of slots all have null entries, obtaining the filled update buffer from the global update buffer queue. Then, the method may further include operating a throttle mechanism for the garbage collector thread to modify a delay period to define a processing time between the garbage collector performing the inspecting of the global array, whereby the delay period is increased when the inspecting results in determining that all of the slots in the global array are null.

In some embodiments, the step of attempting to write the pointer to the global array may include selecting the one of the pointer slots from the plurality of slots in the global array and performing the writing of the pointer when the selected one is null. Further, the step of selecting the one of the pointer slots may include performing a hashing function to select or randomly selecting one of the pointer slots. In another case, the step of attempting to access the global array is repeated a predefined number of times prior to performing the step of adding the filled update buffer to the global update buffer queue.

DETAILED DESCRIPTION

Briefly, the following description is directed to methods and systems for providing garbage collection with low-contention update buffer queuing, which may be particularly well-suited to computer systems with a relatively large number of threads (e.g., up to hundreds of threads and more often 1000 to 2000 or more threads). As will become clear, the methods and systems provide a number of useful advantages. For example, compared with other garbage collection thread data structure techniques, the described low-contention update buffer queuing for application threads reduces synchronization contention by minimizing or at least better controlling the use of a global queue, which is accessed by application/mutator threads to add entries and from which all garbage collector (GC) threads remove entries. To reduce applications' access of the global queue, most of the time, update buffers are provided to or made available to the GC threads via a global array (or global update buffer array), which minimizes the number of collisions between application threads making buffers available (such as previously with all threads adding buffers to a global queue). Further, the fact that most update buffers are made available on the global array allows the GC threads to efficiently discover such filled buffers by iterating over the global array.

Figure 1:
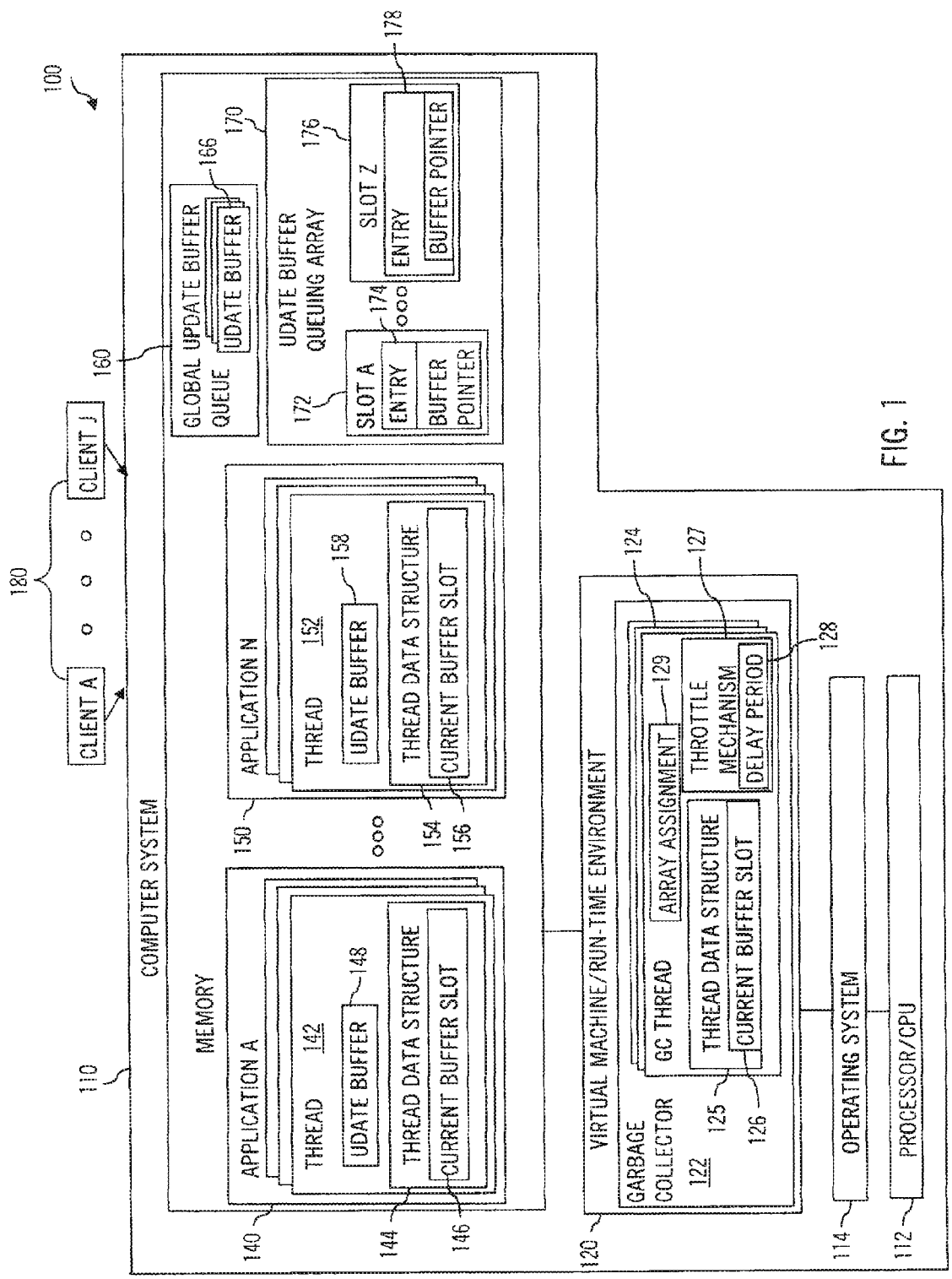
FIG. 1 is a functional block diagram of computing environment with a computer system adapted according to an embodiment to implement update buffer queuing and garbage collection processes with reduced contention, e.g., for systems with larger numbers of threads.

FIG. 1 illustrates a computing environment 100 in which low-contention update buffering may be used to enhance garbage collection and reduce contention for memory resources for running applications. The environment is shown to include a computer system 110 that may facilitate implementation of the update buffering within an application server environment 100, for example, to optimize the application server (not shown but may be provided in system 110) and the applications 140, 150 running thereon.

As shown, the computer system 110 includes one or more processors (or central processing units (CPUs)) 112 that run an operating system 114 and manage memory as shown in FIG. 1. A virtual machine 120, e.g., a JVM or runtime environment or the like, operates upon the operating system 114. Applications 140 to 150 execute within the memory of the system 110, where they may be accessed by clients 170. A garbage collector 122 in accordance with an embodiment described herein is used in conjunction with the virtual machine 120 to garbage collect within the memory in accordance with the garbage collection (including update buffer queuing techniques) described herein.

The garbage collector 122 may have one or more active GC threads 124 that are used to process the memory (e.g., to cycle through the thread data structures update buffer queuing array or global array 170 for non-null finished buffer pointers/ entries in slots 172 to 176 (with entry 174 shown as null while slot 178 is shown as non-null) and, periodically, for update buffers 166 added to the global queue or global update buffer queue 160). Each GC thread 124 may be provided a thread data structure 125 (e.g., a TLS structure or the like) that includes a slot 126 containing a current buffer pointer or reference field pointing to a current buffer being processed by the GC thread 124.

Each of the applications 140 to 150 may have one or more threads 142, 152. According to an embodiment described herein, each of these threads 142, 152 is provided a thread data structure 144, 154 with a number of slots or data slots including a current buffer pointer or update buffer slot 146, 156 that provides a link or reference to a single update buffer 148, 158 provided to each thread 142, 152. These pointers may be initially null prior to an update buffer being obtained or used and later be used to provide pointers or references to an update buffer 148, 158. Further, the computer system memory may include a global queue or global update buffer queue 160 to which a buffer 148, 158 may be added by the thread 142, 152 (or mutator/producer) as shown with update buffer(s) 166 when filled for collection/removal by a GC thread 124 of the garbage collector 122.

According to preferred embodiments, though, the threads 142, 152 are adapted to first attempt to make their filled update buffers 148, 158 available via a global update buffer queuing array (or global array) 170. For example, the thread 142 may act to fill the update buffer 148 and then select one of the slots/entries 172, 176 in the array 170 and copy, using an atomic operation such as a CAS or the like, the contents/pointer from the current buffer slot 146 into the selected slot/entry 172, 176 (e.g., slot 176 to have a non-null entry 178 that is a buffer pointer to buffer 148). The dynamic selection of which slot 172, 176 used may be a random number or random type selection, may be a hashing algorithm (such as one that uses the thread ID in some manner), or other selection process (e.g., the thread 142, 152 may have a slot/entry selection mechanism (not shown in FIG. 1)). If the selection or entry into array 170 is not successful on a first or set number of tries, the thread 142 may then, using an atomic operation such as a CAS or the like, add the update buffer to the global queue 160 as shown with buffer 166 (again, note, each try would likely use a different array index). Typically, the global array 170 will have a number of slots/entries 172, 176 that is much smaller than the number of threads 142, 152 (e.g., not a particular slot 172, 176 provided for or associated with each thread 142, 152), which may lead to a thread 142, 152 selecting a slot 176 that has an entry 178 (or buffer pointer) already (e.g., a GC thread 124 has not yet claimed the thread update buffer previously added to the global array 170). At this point, the thread 142, 152 will try again to select a non-null slot (such as slot 172 with its null entry 174) or add its filled buffer 148, 158 to the global queue 160.

The GC threads 124 are configured to check both the global buffer queuing array 170 (for non-null entries 178) and the global queue 160 (for added buffers 166), and this checking may be in either order but typically will begin with the global array 170 as buffers are first made available here by the threads 142, 152. In some embodiments, a GC thread 124 may include an array assignment 129 that defines a subset of the slots 172, 176 that a particular GC thread 124 is responsible for processing for non-null entries/filled update buffers. This may lead to better GC caching and efficiency by reducing contention among the GC threads 124 for slots 172, 176 and by reducing the number of slots 172, 176 that have to be processed/checked by each GC thread 124. Some overlap of such slots 172, 176 may be provided by the assignments 129 or a GC thread 124 may have sole responsibility for one or more slots/entries 172, 176 (or portions of the array 170). Typically, though, each of the GC threads 124 will also have responsibility to periodically check the global queue 160, but, again, some embodiments may provide one or more GC threads that have the sole or dual (global array 170 and global queue 160) responsibility for processing buffers 166 added to the global queue.

Additionally, the GC thread 124 may include a throttle mechanism 127 to function to self-pace the GC thread 124 in its processing of the global array 170 and/or global buffer queue 160 such as by adjusting a delay period or periodicy setting/timing 128. For example, the computer system 110 may be a large computer system with 4 to 16 CPUs 112 or more and hundreds to 1000 to 2000 threads 142, 152 or more in applications 140 to 150. The number of GC threads 124 typically is less than the number of CPUs 112 (such as one fourth of the available CPUs 112 or 4 GC threads 124 provided when the system 110 has 16 available CPUs 112 or the like) and much less in number than the number of application threads 142, 152. The computer system 110 is preferably designed such that the GC threads 124 do more work than the application threads 142, 152 with relation to making update buffers 148, 158 available and in processing filled buffers 166 (and ones provided via array 170 but not shown in FIG. 1).

In some embodiments, each of the GC threads 124 operates continuously to process over the global array 170 and then the global queue 160, with the number of GC threads 124 being chosen to provide a desired pacing of the garbage collection. In other embodiments (as shown in FIG. 1), though, continuous operation is avoided as this may lead to too much overhead being expended in computer system 110 for garbage collection. The delay period 128 may be initially set at a default setting (e.g., an average amount of time between processing chosen to suit generally a large computer system with a typical number of threads and processing activities/use of memory resources), but it may be too fast or too slow, with a too small delay 128 indicated by repeated finding of only null entries in the global array 170 and a too large delay 128 indicated by repeatedly finding buffers 166 in the global queue 160. The throttle mechanism 127 may be configured to increase the delay period 128 (throttle down processing by a GC thread 124) when the GC thread 124 goes to the global array 170 and to the global queue 160 without finding any buffers to process (or after a number of such misses) as the GC threads use resources that could instead be used by application threads, e.g., represent inefficient use of computer system 110 resources. In contrast, the throttle mechanism 127 may act to decrease the delay period 128 (e.g., throttle up the processing) when the GC thread 124 finds a buffer on the global queue 160 because it is typically preferred that the GC threads 124 rarely (less often) find update buffers 166 added to the global queue 160, as adding and removing buffers to and from the global queue slows down both GC and application threads, e.g., represent inefficient use of computer system 110 resources. In other cases, the throttle mechanism 127 may act to wake up or initiate an additional GC thread(s) 124 to assist in garbage collection including processing the array 170 and global queue 160.

Figure 2:
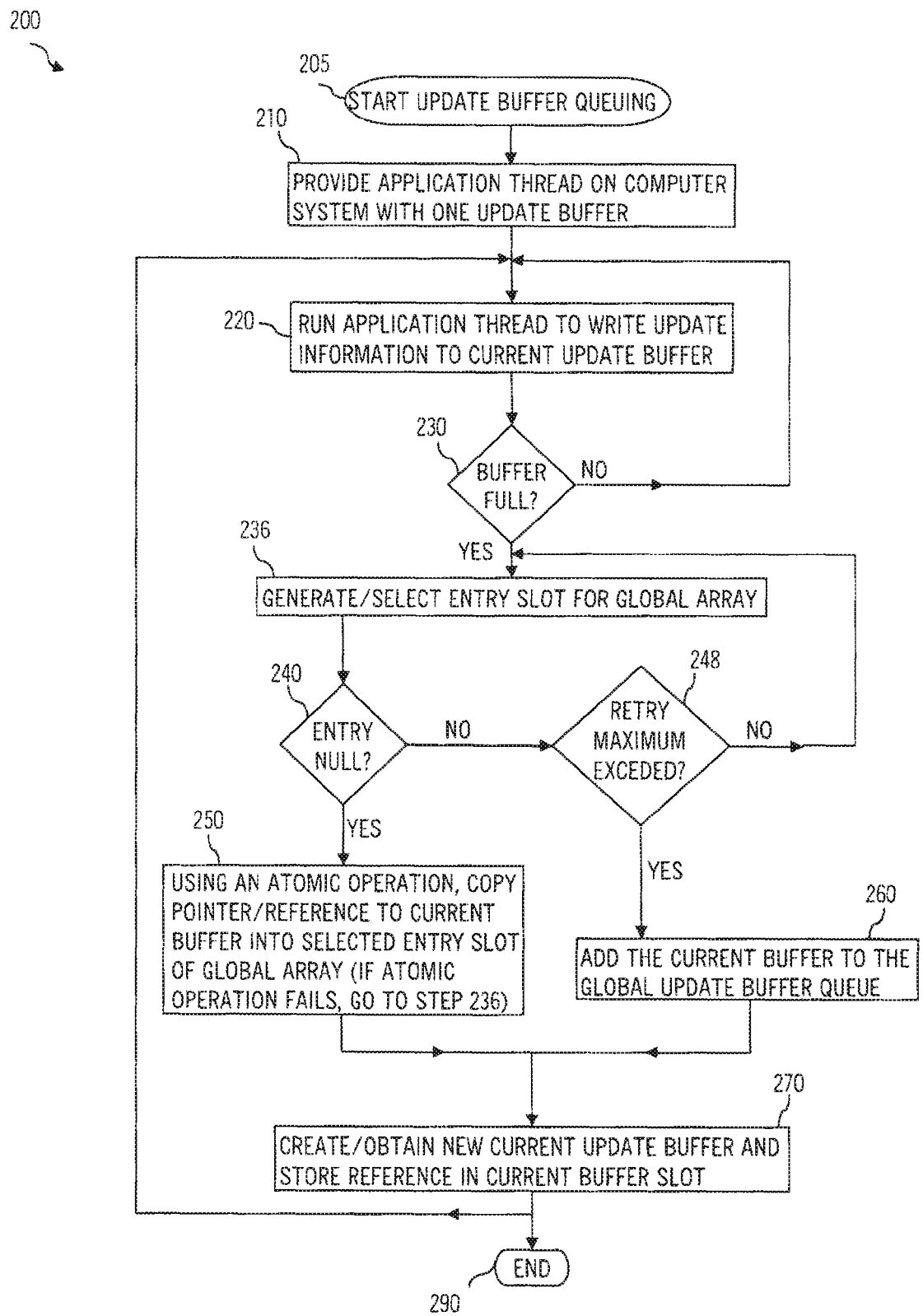
FIG. 2 is a flow diagram of an exemplary update buffer queuing method as may be carried out by one or more producer threads (e.g., application threads, mutator threads, or the like) while running in a computer system memory.
Figure 3:
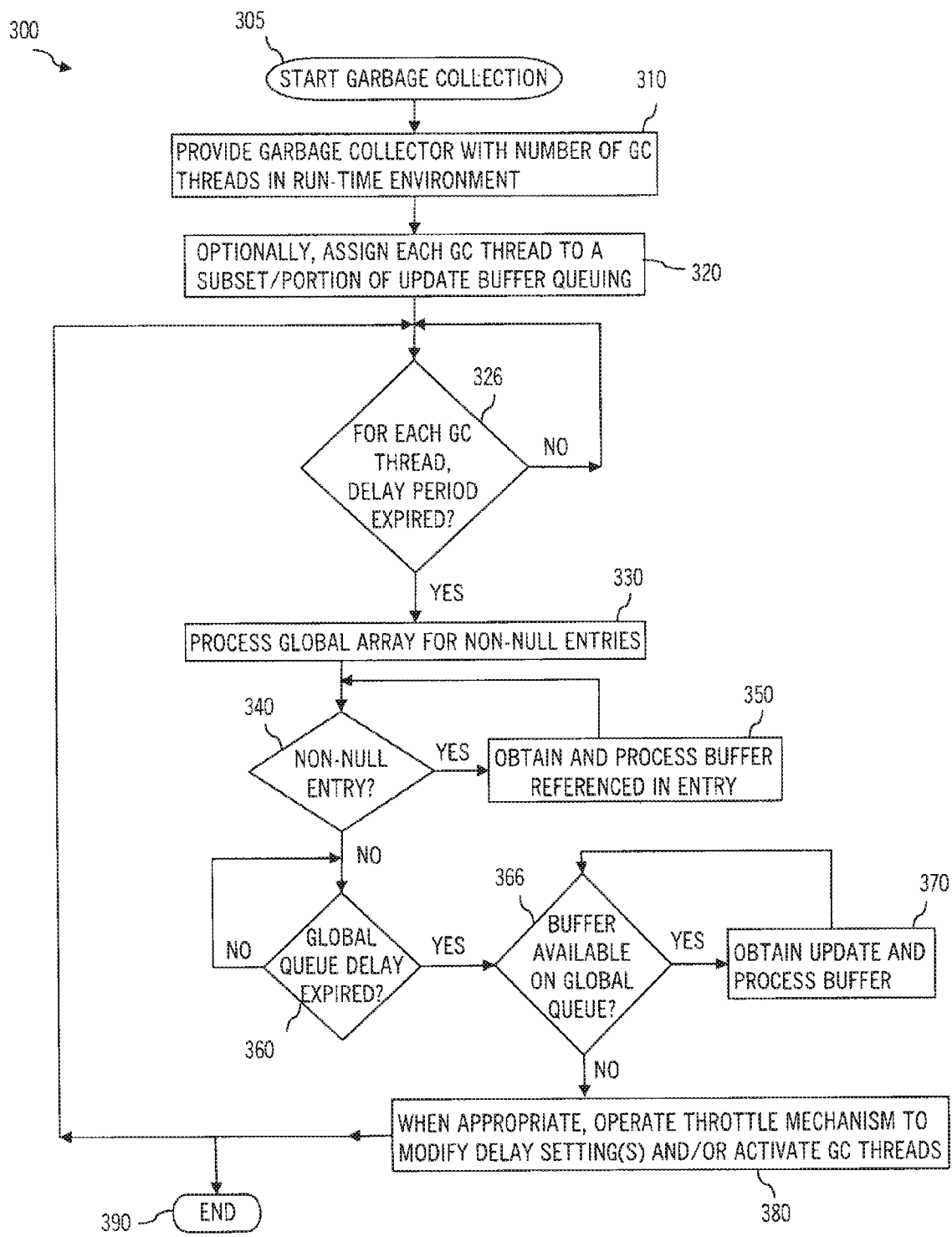
FIG. 3 is a flow diagram of a garbage collection method as may be carried out by one or more threads of a garbage collector in a virtual machine/runtime environment concurrently or as part of the update buffer queuing method shown in FIG. 2.
Figure 4:
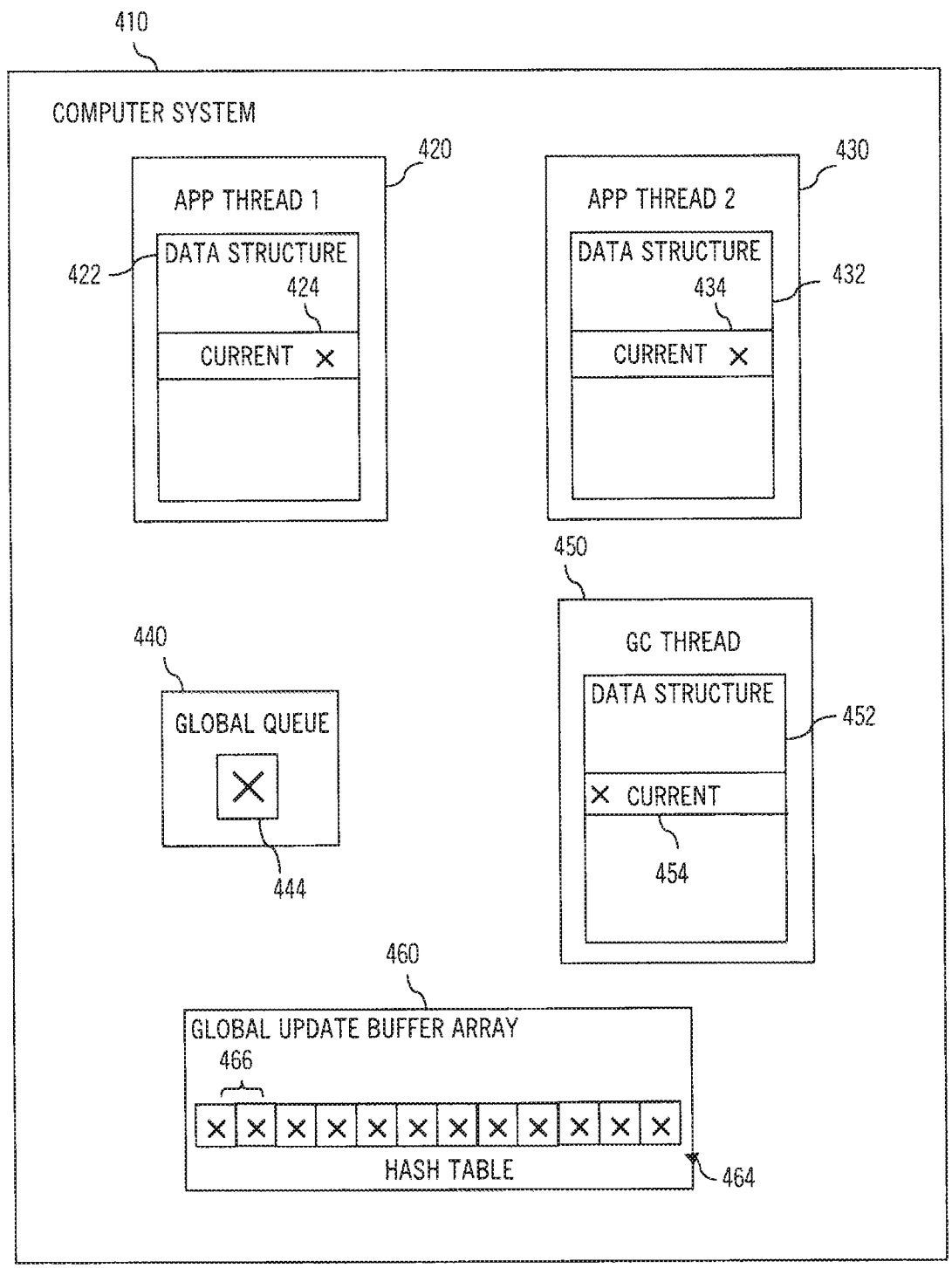
FIGS. 4-9 illustrate schematically update buffer queuing and garbage collection processes during operation of a representative large computer system (e.g., during operation of the computer system of FIG. 1 to perform the methods of FIGS. 2 and 3 or the like).

At this point, it may be useful to describe operation of the system 110 to provide both update buffer queuing and garbage collection with limited or reduced contention. Specifically, FIG. 2 illustrates an update buffer queuing method 200 that may be performed by the threads 142, 152 of applications 140, 150 during operation of the system 110 while FIG. 3 illustrates garbage collection 300 as may be performed by the GC thread(s) 124 of garbage collector 122. The update buffer queuing method 200 starts at 205 such as by configuring applications to operate to perform the update buffer queuing steps and/or to provide a data structure (such as TLS structure) 144, 154 with a current buffer pointer slot 146, 156 associated with its threads 142, 152 (e.g., each thread defines its data structure according to the method 200 and creates and references buffers as described herein).

At 210, each mutator or application thread 142, 152 created for an application 140, 150 within the computer system 110 is provided with a thread data structure 144, 154 in memory (or, in some cases, a subset of the applications 140, 150 have such threads or a subset of an application's threads may be implement update buffer queuing as shown herein), and the thread 142, 152 is provided or obtains a single (at most one) update buffer 148, 158 and the pointer/reference to the buffer 148, 158 is written to slots 146, 156.

At 220, the application thread 142, 152 is run in memory and writes updates or update information to the current buffer 148, 158. At 230, the mutator or application thread 142, 152 checks whether the current buffer 148, 158 is full, and, if not, the method 200 continues at 220. If the current buffer 148, 158 is full at 230, the method 200 continues at 236 with the mutator or application thread 142, 152 attempting to make the filled buffer 148, 158 available (such as with a CAS operation) on a slot/entry 172, 176 of the global array 170. There are a variety of ways the thread 142, 152 may generate/select which entry/slot 172, 176 to use/access in the array 170. In one case, the thread 142, 152 has a selection mechanism that provides a hash such as a hash based on the thread ID (e.g., thread ID % N or the like). In another case, the thread 142, 152 has a selection mechanism that provides a random number generator or a random selector of the possible slots 172, 176 (randomly select among A to Z slots or the like).

Once the entry is chosen by the thread 142, 152, the method 200 continues at 240 with the thread 142, 152 determining whether the entry 174, 178 of the chosen slot 172, 176 is null (e.g., no reference to a buffer is provided in this slot/entry point for the array 170). In not null, the method 200 continues at 248 with the thread 142, 152 determining whether some preset number of maximum retries at accessing the array 170 has been exceeded (e.g., 0, 1, 2, 3, or more retries). If not exceeded, the process 200 continues at 236 with the thread 142, 152 selecting a new slot 172, 176 for entering a pointer to the filled buffer (such as with a new/different hash function, random number. If at 248 the maximum number is exceeded, the method 200 continues at 260 with the thread giving up and adding the current, filled update buffer to the global update buffer queue 160 as shown at 166 (or adding the update information to the global update buffer queue 160).

If at 240 the entry 174 in the chosen slot 172 in the array 170 is null, the buffer 148, 158 is made available on the array 170 by providing, possibly using an atomic operation such as a CAS or the like, a reference/pointer entry to the filled buffer in the chosen/selected data slot 172 of the array 170. If the making available succeeds, the method 200 then continues at 270 with the thread 142, 152 creating or obtaining a new, empty update buffer and storing reference to this update buffer 148, 158 in the current buffer slot 146, 156 of its thread structure 144, 154. The method 200 may then continue at 220 with writing update information to the update buffers 148, 158 and/or at 290 by ending the method 200. The adding of the buffer to the queue 160 may be performed with an atomic operation.

While the threads 142, 152 are performing the update buffer queuing 200, garbage collection 300 may be performed by the threads 124 of the garbage collector 122. Garbage collection 300 may start at 305 such as by providing a garbage collector 122 in the virtual machine or runtime environment 120 of the computer system 110 that is adapted or configured (e.g., with code devices) to provide the steps of method 300. At 310, one or more GC threads 124 are provided in the virtual machine 120. At 320, an optional step may be performed to assign 129 each GC thread 124 a subset or number of the slots 172, 176 of the global array 170 to check/process for buffer entries by producers or application threads 142, 152.

In general, the GC threads 124 periodically check the global array 170 for non-null entries 178 in slots 172 to 176. If a GC thread 124 finds one, the thread 124 claims the buffer for processing (e.g., with a CAS or other atomic operation) and processes the buffer. The GC threads 124 also periodically check the global queue 160. Since there is not a notify call when a buffer is made available as in prior systems/methods, it may be preferable that each GC thread 124 is self-pacing such as by use of a throttle mechanism 127. For example, after a few failed attempts the GC thread 124 may increase their wait time 128 between attempts. If the GC thread 124, in contrast, notices that buffers 166 are being added to the global queue 160, the throttle mechanism 127 acts to decrease the wait time 128 between attempts to find non-null entries 178 in the global array 170 by a GC thread 124, as a non-empty global queue 160 indicates the GC 122 and its threads 124 are not processing buffers from the global array 170 at a fast enough pace (e.g., typically want to minimize application threads 142, 152 having to add their filled buffers 148, 158 to the global queue 160 as shown as buffer(s) 166).

As shown in FIG. 3, the method 300 continues at 326 with each GC thread 124 determining whether its delay/throttle period 128 has expired, and, if not, continuing to wait/delay accessing the global array 170. If past, the method 300 continues at 330 with the GC thread 124 processing the global array 170 looking for non-null entries such as the entry 178 in slot 176 in array 170 of system 110. Upon finding a non-null entry (usually first one found by the GC thread 124 in the subset assigned 129 to the GC thread 124 which may include all slots or entire array), the method 300 continues at 350 with the GC thread 124 claiming or obtaining, using an atomic operation such as a CAS or the like, the buffer 148 or 158 and processing it as part of a conventional garbage collection/data removal process by a garbage collector 122. The method 300 may then continue at 340 with looking for additional non-null entries in the array 170 or with going to the global queue 160 at 360.

At 340, when the GC thread 124 finds all slots having a null entry 174, the method 300 continues with determining whether a global queue delay has expired (if used). If not, the GC thread 124 may pause until a preset period has expired. Once the delay (if used) expires at 360, the method 300 continues at 366 with the GC thread 124 determining whether an update buffer 166 is available on the global update buffer queue 160. If yes, the method 300 continues at 370 with the GC thread 124 obtaining and processing the update buffer 166. If no, the method 300 continues at 380 with operating a throttle mechanism 127 as appropriate to modify the delay setting(s) 128 and/or to activate additional GC threads 124. For example, the throttle mechanism 127 may determine that a buffer 166 was found on the queue 160 and decrease the delay period 128 to speed up processing by the GC threads 124 or even act at this point to awaken a GC thread 124 (such as after shortening the delay period 128 to some minimum amount). In other cases, the throttle mechanism 127 may determine that no buffers were found in either the global array 170 or the global queue 160 and respond by increasing the delay period 128 incrementally or by some calculated amount (e.g., differing amounts may be used based on the number of times no update buffers have been found by GC threads 124 or the like). The method 300 may then continue at 326 or end at 390.

With the system 110 and methods 200 and 300 understood, it may be useful to further explain the update buffer queuing and garbage collection techniques with reference to operation of a relatively simplistic computer system 410 with reference to FIGS. 4-9. As shown in an initial state in FIG. 4, the computer system 410 includes in its memory first and second application threads 420, 430, with each thread being provided a data structure 422, 432 (such as a TLS structure or the like) that each includes a current buffer point or reference slot 424, 434. The use of an "X" symbol denotes or indicates that the pointer/reference value is null at a particular point in the operation of the system 410. The computer system 410 also includes a GC thread 450 with a data structure 452 that includes a current buffer slot 454 that points to the buffer that is presently being processed by the GC thread 450 (which is initially null or no buffer is being processed). The computer system 410 also includes a global queue 440 with a field 444 pointing to none ("null" as shown), one, or more buffers that have been made available by threads 420, 430 for garbage collection or processing by the GC thread 450.

Still further, the system 410 includes a global update buffer array 460 that is used by threads 420, 430 to make their filled update buffers available to the GC thread 450. The array 460 may take a number of forms to practice the system 410, with FIGS. 4-9 showing a hash table 464 with a number of slots or data entries 466 (e.g., a 12-slot hash table or the like), presently shown as all being null (or "X"). In the following example, the update buffers provided to each thread 420, 430 are assumed to be 4-slot buffers and the update buffer queuing and garbage collection is performed with no hash table retries (e.g., application threads 420, 430 only attempt to access the array 460 once prior to adding their filled buffers to the global queue 440).

Figure 5:
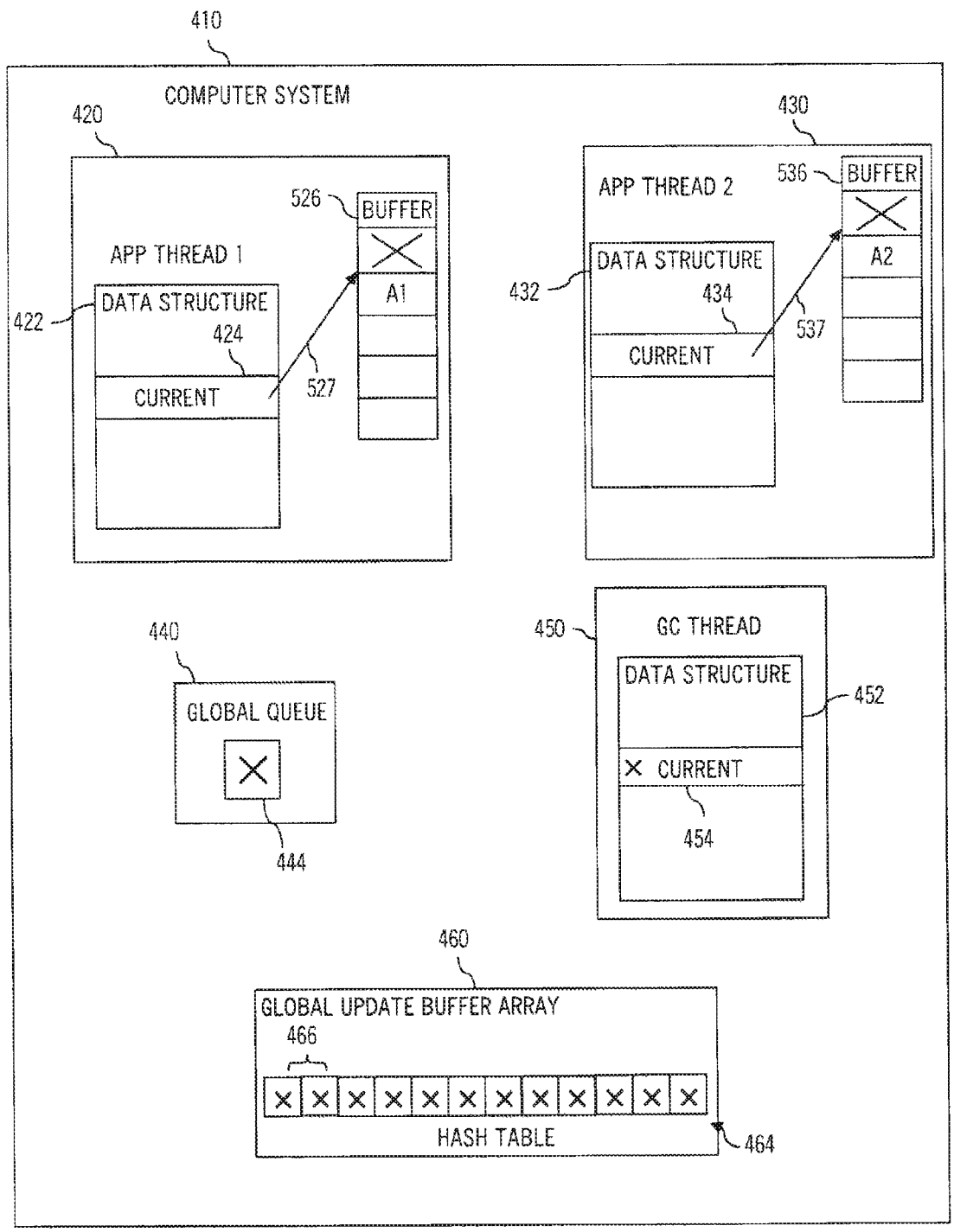
Figure 6:
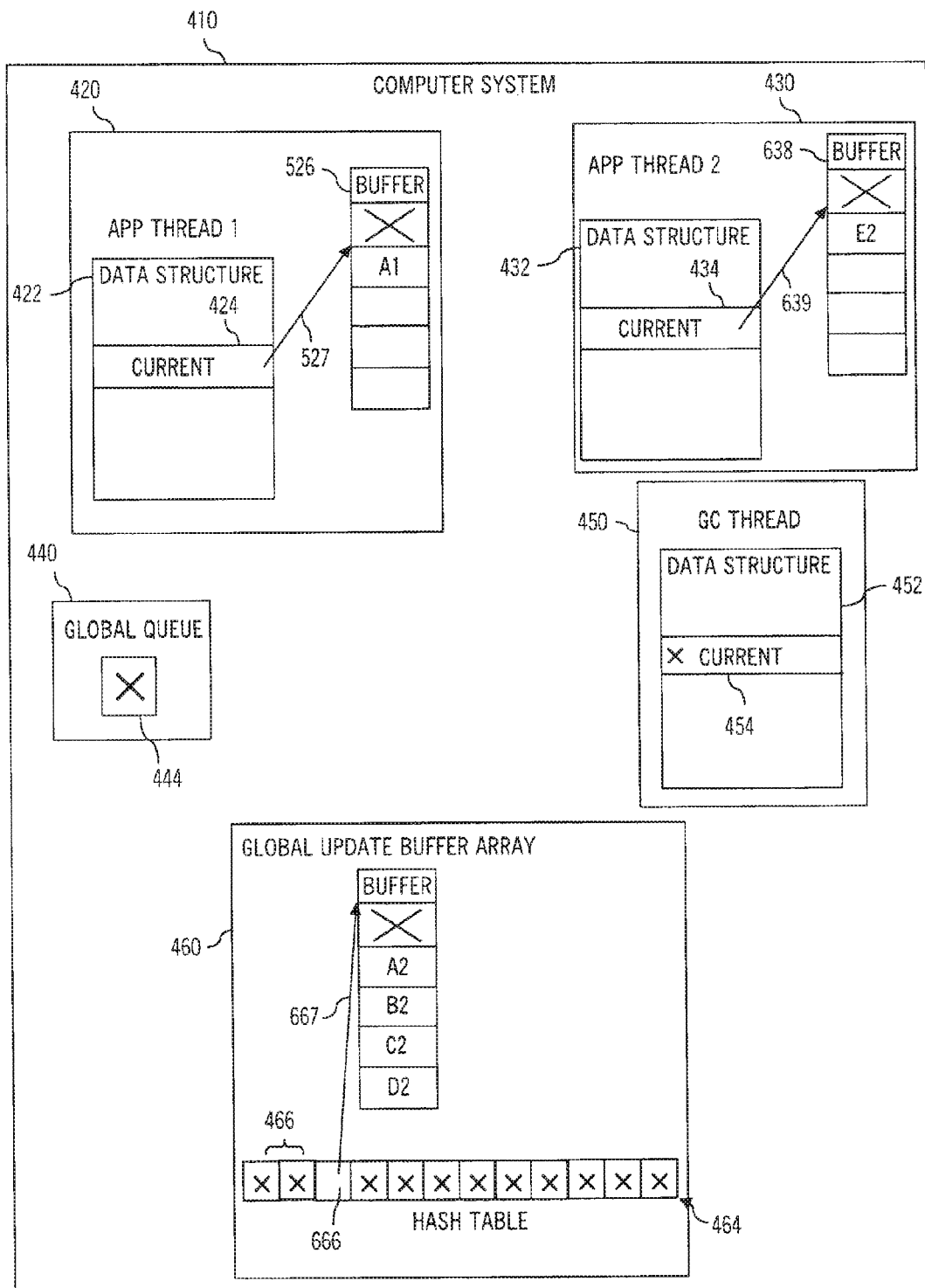

In the operational state shown in FIG. 5, the computer system 410 is being operated with both application threads 420, 430 being provided an update buffer 526, 536. The threads 420, 430 are beginning to fill these buffers 520, 530 with update information (with update information being represented with A1, A2, and the like in the figure), and the current update buffer slots 424, 434 have been updated to provide a pointer/reference 527, 537 to these presently in use (and not yet full) update buffers 526, 536. In the operational state shown in FIG. 6, the computer system 410 is being operated such that the second application thread 430 has filled up its initial update buffer 536. The thread 430 has made this buffer available on the global update buffer array 460 such as by hashing it into a slot 666 (e.g., with a CAS) shown as pointer 667 to buffer 536 (e.g., a hash algorithm may be used by thread 430 to initially select slot 666, and, since the slot was null, the thread 430 may successfully provide a pointer 667 to its filled update buffer 536). The thread 430 gets a new update buffer 638 which it references via pointer value 639 provided in the current update buffer slot 434. Hence, the buffer 536 is now available for garbage collection via the global array 460 (rather than being added immediately to the global queue 440 as in past methods).

Figure 7:
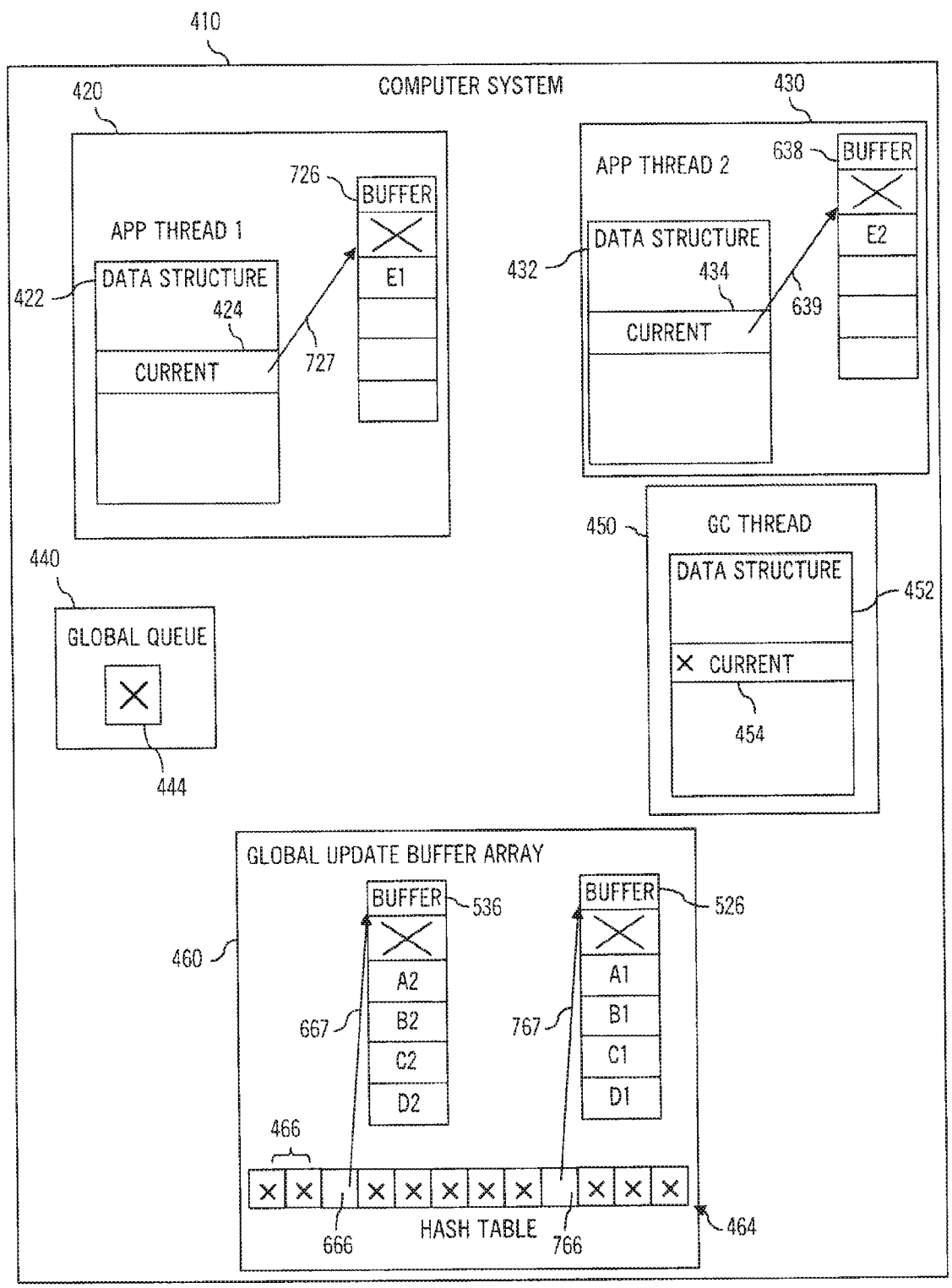

In the operational state shown in FIG. 7, the system 410 is operated such that the first application 420 has filled up its initial update buffer 526. It has also acted to select a slot 766 in the array 460 (e.g., performed a hash algorithm to choose a slot 466 in the hash table 464), and, upon finding it to be null, the thread 420 has added or hashed it into the slot 766 (e.g., with a CAS or the like) to provide a reference/pointer 767 to the filled update buffer 526. The thread 420 has then acted to obtain a new, empty update buffer 726 and provided a pointer/reference 727 to this buffer 726 in its current update buffer slot 424 of its data structure 422.

Figure 8:
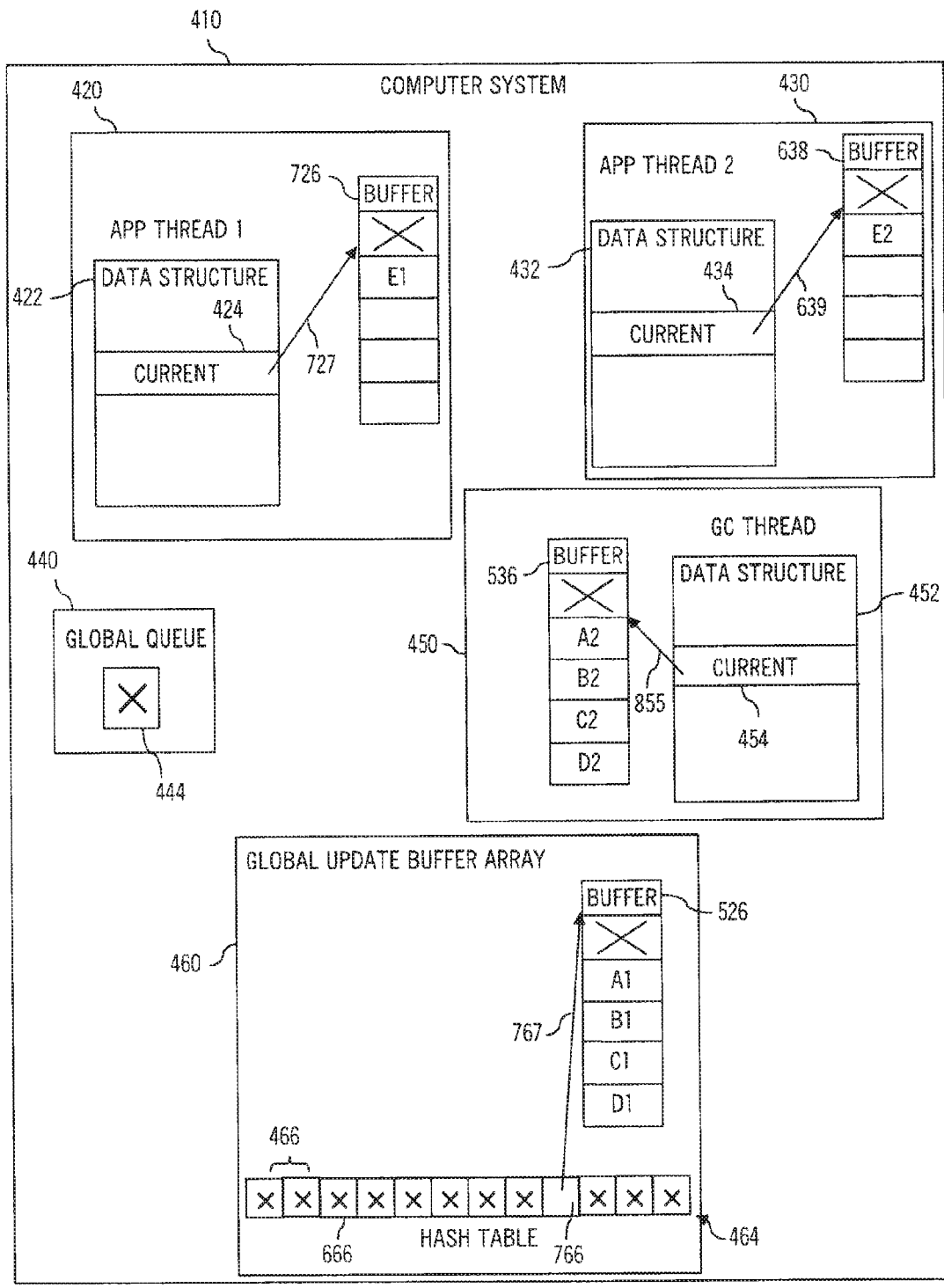

In the operational state shown in FIG. 8, the computer system 410 is operated with the GC thread 450 checking the global update buffer array 460 and finding the slot 666 to be non-null (the first filled buffer it finds to be referenced in the hash table 464). In response, the GC thread 450 gets or claims via a CAS the filled update buffer 536 and writes null to the slot 666. The GC thread 450 starts processing the buffer 536, as is indicated by its update of the currently processed buffer slot 454 of thread structure 452 with a pointer/reference 855 to the buffer 536.

Figure 9:
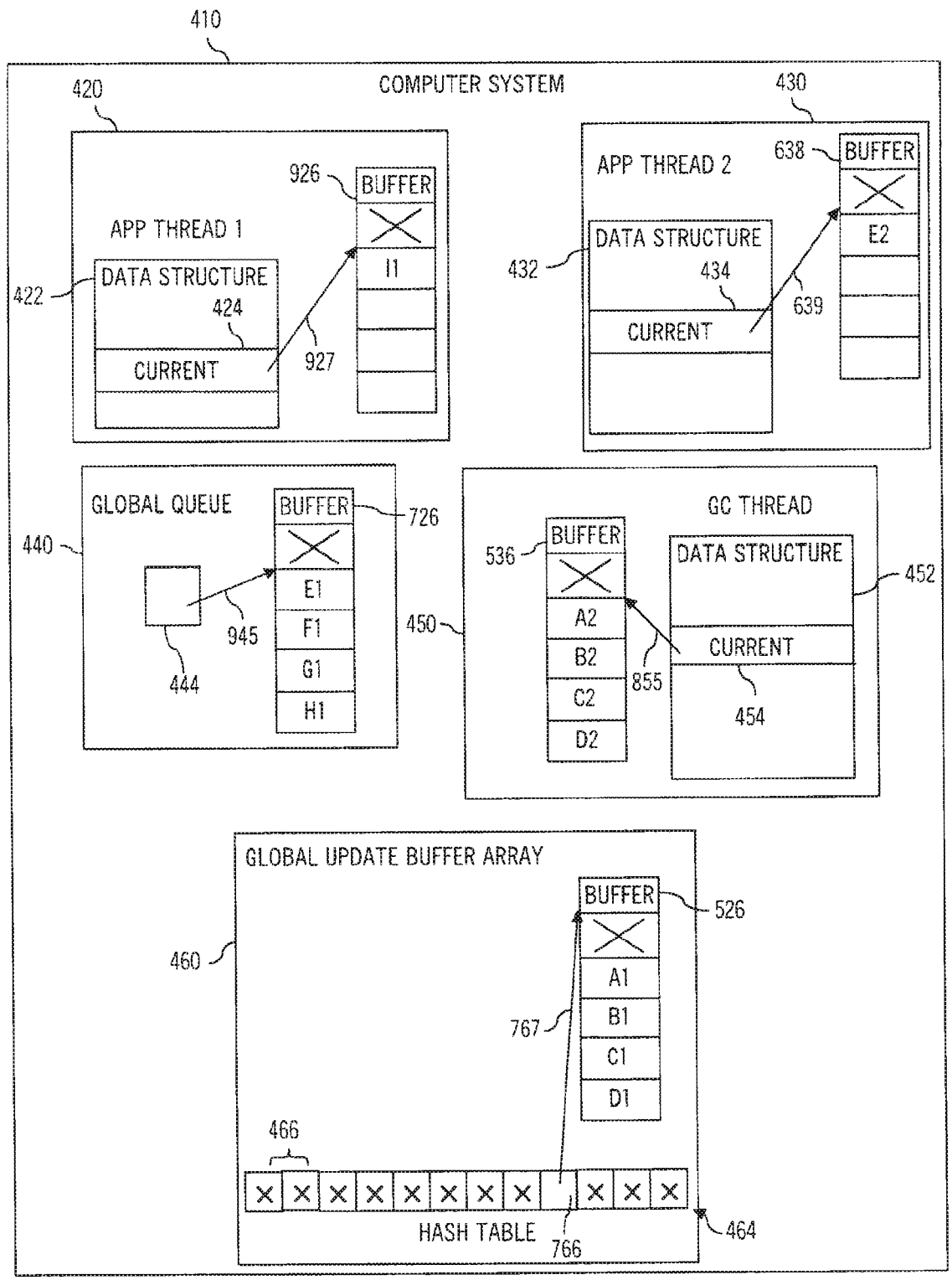

In the operational state shown in FIG. 9, the processing by the GC thread 450 of the buffer 536 continues. Additionally, the first application thread 420 has filled up its update buffer 726 and has unsuccessfully tried to hash it into the array 460 (e.g., the selection of a slot 466 produced non-null slot 766). In response, the application thread 420 accesses the global queue to make its newly filled buffer 726 available on the global queue 440 with a lock or other atomic operation and providing a reference 945 to the filled update buffer 726 in structure 444. The first application thread 420 then acts to get a new update buffer 926 and to provide a pointer/reference 927 to this buffer 926 in the current update buffer slot 424 of its thread structure 422.

Further, operations of the system 410 may include the GC thread 450 completing processing the buffer 536 and then accessing the global array 460 to find the non-null entry 767 in slot 766. In response, the GC thread 450 will obtain the buffer 526 and process it, and also the GC thread 450 will update the slot 766 to be null. In a next step, the GC thread 450 may (after a delay period set by a throttle mechanism) access the global array 460 and find all entries/slots 466 in the hash table 464 to be null. At this point, the GC thread 450 may act to access the global queue 440 and inspect the structure 444 to find the pointer 945 to available work/input buffer 726. The GC thread 450 then acts to claim (e.g., via a CAS) the buffer 726 and write null to the structure 444 and process the buffer 726.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. The thread structures providing the current update buffer and finished buffer slots may be provided using thread-local storage (TLS), which uses static or global memory local to a thread, but this is not required as nearly efficiently accessible data structure may be used to store the references to current and filled/finished buffers. The update buffer queuing and garbage collection techniques are particularly well suited to computer systems that allocate memory as objects for example that provide a runtime environment such as a Java® Virtual Machine (JVM), but this is not required to implement the methods and systems taught herein.

Embodiments of the subject matter described in this specification can be implemented as one or more computer program products, i.e., one or more modules of computer program instructions encoded on a computer-readable medium for execution by, or to control the operation of, data processing apparatus. For example, the modules used to provide the applications 140, 150 and garbage collector 122 and the like may be provided in such computer-readable medium and executed by a processor or the like. The computer-readable medium can be a machine-readable storage device, a machine-readable storage substrate, a memory device, a composition of matter affecting a machine-readable propagated signal, or a combination of one or more of them. The term computer system that uses/provides the update buffer queuing and garbage collection method/processes encompasses all apparatus, devices, and machines for processing data, including by way of example a programmable processor, a computer, or multiple processors or computers. The system (such as systems 110 and 410 of FIGS. 1 and 4-19) can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) used to provide the functionality described herein (such as to update buffer queuing and garbage collection) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. The techniques described herein may be implemented by a computer system configured to provide the functionality described.

For example, FIG. 1 is a block diagram illustrating one embodiment of a computer system 110 configured to implement the methods described herein. In different embodiments, computer system 110 may be any of various types of devices, including, but not limited to a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry. To provide for interaction with a user (with an I/O portion 524 of system 520 or the like), embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

Note, in the following claims, an update buffer may contain nearly any information. The use of the term "update buffer" is considered general and not specific. Use of the term "update buffer" or "buffer" in the specification and the following claims is generally a specialization or example of the more general case covering nearly any data to be communicated from mutator to GC threads.

We claim:

1. A method of queuing buffers for garbage collection in a computer system, comprising:

in a memory of the computer system, providing a global update buffer queue and a global array with slots for storing pointers to update buffers filled by application threads;

running an application thread in the memory of the computer system;

providing, for the application thread, an update buffer in the memory and a data structure including a current update buffer slot with a pointer to the update buffer;

with the application thread, writing to the update buffer;

after the writing fills the update buffer, attempting with the application thread to write the pointer for the filled update buffer to one of the slots of the global array for storing pointers;

when the attempting fails, operating the application thread to add the filled update buffer to the global update buffer queue;

with a garbage collector thread, inspecting the global array for non-null entries in the slots and, upon locating the pointer, claiming the filled update buffer for processing; and with the garbage collector thread when the slots all have null entries, obtaining the filled update buffer from the global update buffer queue;

wherein the claiming is performed with an atomic operation; and wherein the claiming further comprises changing the one of the slots of the global array for storing pointers to null.

2. The method of claim 1, further comprising operating a throttle mechanism for the garbage collector thread to modify a delay period to define a processing time between the garbage collector performing the inspecting of the global array, whereby the delay period is increased when the inspecting results in determining all of the slots in the global array are null.

3. The method of claim 1, wherein the attempting to write the pointer to the global array comprises selecting the one of the slots to write the pointer for the filled update buffer from the slots in the global array for storing pointers and performing the writing of the pointer when the selected one is null.

4. The method of claim 3, wherein the performing of the writing of the pointer is an atomic operation and wherein the performing of the writing of the pointer further comprises changing the one of the slots in the global array for storing pointers to a non-null value.

5. The method of claim 4, wherein the selecting of the one of the slots to write the pointer for the filled update buffer comprises performing a hashing function or randomly selecting one of the slots of the global array for storing pointers and wherein the attempting is repeated a predefined number of times prior to performing the operating of the application thread when the attempting fails including adding the filled update buffer to the global update buffer queue.

6. A computer system adapted for update buffer queuing, comprising:
a processor running an operating system;
a runtime environment including a virtual machine provided on the operating system;
a memory including a global queue and an update buffer queuing array;
a garbage collector provided in the virtual machine including a plurality of garbage collector threads processing buffers by first processing the update buffer queuing array and second processing the global queue; and
a plurality of application threads running in the memory, wherein each of the application threads is provided an update buffer and wherein, upon filling the update buffer, each of the application threads attempts, using an atomic operation, to write a reference to the filled update buffer in a slot of the update buffer queuing array;
wherein, only when the attempt to write fails, each of the application threads adds the filled update buffer to the global queue for processing by one of the garbage collector threads;
wherein the writing of the reference comprises each of the application threads selecting the slot from a number of slots in the update buffer queuing array and writing the reference when the selected slot is null; and
wherein the writing of the reference further comprises repeating the dynamically selecting of the slot, at least a first time, when the selected slot is non-null.

7. The system of claim 6, wherein the selecting of the slot comprises hashing based on an identifier associated with the respective application thread.

8. An update buffer queuing method, comprising:
providing a garbage collector thread in a runtime environment of a computer system;
with the garbage collector thread, inspecting entries of global update buffer array for a non-null entry;
when the inspecting finds the non-null entry, claiming with an atomic operation a filled update buffer associated with an application thread that is referenced by the non-null entry for processing;
after the claiming, using the garbage collector thread to write null to the non-null entry;
when the inspecting fails to find the non-null entry, accessing a global queue to determine a presence of a filled update buffer and, when the presence is determined, claiming the filled update buffer for processing using the atomic operation;
running a plurality of application threads with each of the plurality of application threads writing pointers in the global update buffer array to provide additional ones of the non-null entry with references to filled update buffers; and
operating each of the plurality of application threads to add the filled update buffers to the global queue upon selecting a slot for the non-null entry writing that contains one of the pointers.

9. The method of claim 8, further comprising further operating each of the plurality of application threads to select a slot to write the additional ones of the non-null entry in the global update buffer array using a random number generator or a hashing function.

10. The method of claim 8, further comprising operating a throttle mechanism to reduce a delay period defining a period of time between repeating the inspecting of the global update buffer array when the presence of the filled update buffer is determined.

11. The method of claim 8, further comprising operating a throttle mechanism to increase a delay period defining a period of time between repeating the inspecting of the global update buffer array when the inspecting fails to identify the non-null entry.

* * * * *

UNITED STATES PATENT AND TRADEMARK OFFICE
CERTIFICATE OF CORRECTION

PATENT NO. : 8,782,306 B2  Page 1 of 1
APPLICATION NO. : 12/699370
DATED : July 15, 2014
INVENTOR(S) : Printezis et al.

It is certified that error appears in the above-identified patent and that said Letters Patent is hereby corrected as shown below:

In the Drawings

On sheet 2 of 9, in figure 2, under Reference Numeral 248, line 3, delete "EXCEDED" and insert -- EXCEEDED --, therefor.

Signed and Sealed this
Twenty-fourth Day of February, 2015

Michelle K. Lee
*Deputy Director of the United States Patent and Trademark Office*